(12) United States Patent
Pinto et al.

(10) Patent No.: US 8,296,491 B2
(45) Date of Patent: *Oct. 23, 2012

(54) HOST FOR USE WITH DUAL INTERFACE CARD WITH BACKWARD AND FORWARD COMPATIBILITY

(75) Inventors: Yosi Pinto, Kfar Vradim (IL); Amir Fridman, Tel Aviv (IL)

(73) Assignee: Sandisk IL Ltd., Kfar Saba (IL)

( * ) Notice: Subject to any disclaimer, the term of this patent is extended or adjusted under 35 U.S.C. 154(b) by 91 days.

This patent is subject to a terminal disclaimer.

(21) Appl. No.: 12/717,072

(22) Filed: Mar. 3, 2010

(65) Prior Publication Data

US 2011/0040918 A1 Feb. 17, 2011

Related U.S. Application Data

(63) Continuation of application No. 12/676,339, filed on Mar. 3, 2010.

(60) Provisional application No. 61/234,133, filed on Aug. 14, 2009.

(30) Foreign Application Priority Data

Sep. 15, 2009 (WO) .................. PCT/IB2009/006841

(51) Int. Cl.
*H05K 7/10* (2006.01)
*G06F 3/00* (2006.01)
(52) U.S. Cl. .......................................... 710/301; 710/16
(58) Field of Classification Search .................. 710/301, 710/16

See application file for complete search history.

(56) References Cited

U.S. PATENT DOCUMENTS

| 5,887,145 | A  | 3/1999  | Harari et al.  |
| 5,928,347 | A  | 7/1999  | Jones          |
| 6,820,148 | B1 | 11/2004 | Cedar et al.   |
| 7,090,124 | B2 | 8/2006  | Wallace et al. |

(Continued)

FOREIGN PATENT DOCUMENTS

EP 0 883 083 A1 12/1998

(Continued)

OTHER PUBLICATIONS

Notification of Transmittal of the International Search Report and the Written Opinion of the International Searching Authority, or the Declaration for International Application No. PCT/IB2009/006841 mailed Feb. 5, 2010, 12 pages.

(Continued)

*Primary Examiner* — Glenn A Auve
*Assistant Examiner* — Nimesh G Patel
(74) *Attorney, Agent, or Firm* — Toler Law Group, PC (57) ABSTRACT

Techniques are presented that allow a memory card operable according to two protocols (such as a legacy protocol and newer protocol), and having a corresponding dual interface, to be used with hosts that support the new protocol as well as having backward compatibility with legacy hosts, while preventing the use of legacy cards with hosts that support the new protocol but do not support the legacy protocol. The card that supports the new protocol has a similar form factor to the legacy card, includes an indentation. A host that supports the new, but not the legacy, type card includes a mechanical structure within the attachment slot that, based on the card indentation, can distinguish the card types and prevent the non-supported card from being attached.

10 Claims, 5 Drawing Sheets

U.S. PATENT DOCUMENTS

| | | |
|---|---|---|
| 7,136,951 B2 | 11/2006 | Deng et al. |
| 7,305,535 B2 | 12/2007 | Harari et al. |
| 7,360,003 B2 | 4/2008 | Toombs et al. |
| 7,364,090 B2 * | 4/2008 | Cuellar et al. ................ 235/492 |
| 2001/0008581 A1 * | 7/2001 | Fuchimukai .................. 396/321 |
| 2001/0030883 A1 * | 10/2001 | Iima et al. ....................... 365/51 |
| 2003/0093606 A1 | 5/2003 | Mambakkam et al. |
| 2004/0215996 A1 | 10/2004 | Kanamori et al. |
| 2005/0005045 A1 * | 1/2005 | Kim et al. ....................... 710/74 |
| 2005/0279839 A1 | 12/2005 | Kuo |
| 2007/0150891 A1 | 6/2007 | Shapiro |
| 2008/0228973 A1 * | 9/2008 | Lee ............................... 710/105 |
| 2008/0301483 A1 | 12/2008 | Bychkov et al. |
| 2008/0318449 A1 | 12/2008 | Ma et al. |
| 2010/0173517 A1 * | 7/2010 | Hubert et al. ................. 439/490 |

FOREIGN PATENT DOCUMENTS

| | | |
|---|---|---|
| EP | 0 929 043 A1 | 7/1999 |
| EP | 1 278 154 A1 | 1/2003 |
| KR | 2008 0070464 A | 7/2008 |
| WO | WO 99/45460 | 9/1999 |

OTHER PUBLICATIONS

Non-Final Office Action mailed Dec. 9, 2011 in U.S. Appl. No. 12/676,339, 8 pages.

* cited by examiner

HOST FOR USE WITH DUAL INTERFACE CARD WITH BACKWARD AND FORWARD COMPATIBILITY

CROSS-REFERENCE TO RELATED APPLICATION

This application claims the benefit of U.S. Provisional Application No. 61/234,133, filed Aug. 14, 2009, and also claims the benefit of International Application No. PCT/IB2009/006841, filed Sep. 15, 2009. This application is a continuation of Pinto et al., entitled "Dual Interface Card with Backward and Forward Compatibility," U.S. application Ser. No. 12/676,339, filed Mar. 3, 2010, which applications are incorporated herein in their entirety by this reference.

FIELD OF TECHNOLOGY

This invention relates generally to the use and structure of removable electronic circuit cards having different mechanical and/or electrical interfaces, particularly those including mass re-programmable non-volatile integrated circuit memory.

BACKGROUND

Electronic circuit cards, including non-volatile memory cards, have been commercially implemented according to a number of well-known standards. Memory cards are used with personal computers, cellular telephones, personal digital assistants (PDAs), digital still cameras, digital movie cameras, portable audio players and other host electronic devices for the storage of large amounts of data. Such cards usually contain a re-programmable non-volatile semiconductor memory cell array along with a controller that controls operation of the memory cell array and interfaces with a host to which the card connected. Several of the same type of card may be interchanged in a host card slot designed to accept that type of card. However, the development of the many electronic card standards has created different types of cards that are incompatible with each other in various degrees. A card made according to one standard is usually not useable with a host designed to operate with a card of another standard.

A number of standards exist for memory cards, which continue to evolve as new standards are introduced. For example, one generation of memory cards may introduce a higher speed bus than a preceding generation. For practicality in the market, it is desirable to optimize the user experience with minimal frustration along with an effort to minimize the host and card manufacturer's risk by keeping backward compatibility with older protocols at various levels.

SUMMARY

In view of the foregoing, a number of embodiments of system and method are illustrated and described in this document to exemplify possible implementations. One embodiment is that of a non-volatile memory card that is operable according to a first protocol and a second protocol and is removably connectable to a host through a slot formed in the host for connection of the memory card to it. The memory card has a first set of contacts for physically and operatively coupling between the memory card and the host according to the first protocol. The memory card has also a second set of contacts for physically and operatively coupling between the memory card and the host according to the second protocol. The first and second sets of contacts differ by at least one of the contact. The memory card also includes an indentation along a first edge that is orthogonal to a second edge of the memory card. When the second edge of the memory is inserted into the slot of a host, when the memory card is inserted into this slot, the host can identify this memory card as one which is operable according to the first protocol and distinguish it from a second type memory card of a similar form factor except for the indentation and that is not operable according to the first protocol.

A digital appliance is presented that includes a slot structure having an opening, possibly rectangular, to allow a first type memory card having a first set of contacts to be removably connected by insertion into the slot structure to operate with the digital appliance according to a first protocol. The slot structure having formed within it a mechanical structure that can distinguish the first type memory card from a second type memory card, where the second type memory card has a second set of contacts, where the first and second sets of contacts differ by at least one of the contacts, and the second type memory card being operable according to a second protocol not supported by the digital appliance and not being operable according to the first protocol. The first and second type memory cards have a similar form factor except for an indentation along a first edge of the first type memory card, the first edge being a different edge than the one inserted into the digital appliance when the memory card is inserted into the slot for connection thereto, whereby the mechanical structure prevents the connection of the second type memory based on the lack of the indentation.

Various aspects, advantages, features and embodiments of the present invention are included in the following description of exemplary examples thereof, which description should be taken in conjunction with the accompanying drawings. To the extent of any inconsistency or conflict in the definition or use of terms between any of the incorporated publications, documents or things and the present application, those of the present application shall prevail.

DETAILED DESCRIPTION OF EXEMPLARY EMBODIMENTS

As noted in the Background, a number of standards exits for memory cards, which continue to evolve as new standards are introduced. For example, one generation of memory cards may introduce a higher speed bus than a preceding generation. Such newer generation cards could be defined by an infrastructure based on a new generation of hardware and new interface pinout. For practicality in the market, there is a motivation is to optimize the user experience with minimal frustration along with effort to minimize the host and card manufacturer's risk. This can be done by keeping backward compatibility with older protocols at various levels. Assuming that this backward compatibility is not mandatory for all sides (host and card) at all times there is a need to handle cases of non compatible devices matches. Further, it may happen that initially new host will support both interfaces and after some transition period they will remove the support of legacy protocol support. Although more generally applicable, the various embodiments here provide user friendly solutions that protect both card and host from any "illegal" combination, such as connecting an old card to a host supporting only new card. The techniques given here also provide a simple method for a user to decide whether to use the old interface or the new interface method.

Such evolution has occurred in the past and been dealt with in various ways. One way is for cards and hosts that continue to support the legacy protocol and new protocols; but this often limits optimization of the cost aspect advantages and moving forward with advanced technology of the new protocol. Another approach is using an adaptor as a mediator between one structure and another, such as, for example, a micro-SD™ to SD™ adaptor. (Adaptors are discussed in U.S. Pat. No. 5,887,145, for example, which is hereby incorporated herein by this reference in its entirety.) Yet another approach is marking the new card with a visible sign that indicates the user the card's compatibility or incompatibility to proper hosts. The problem is that users are often confused by the various card types and it may happen that user will try to insert an old card to new hosts (especially if the card's slot and the new/old card's form factors look mechanically the similar). There are solutions in the market that support cases in which new cards cannot be inserted to old hosts but old cards can be inserted to new protocol hosts (for example, the MMC-SD case)—a solutions usually implemented by different mechanical dimensions. The present case being developed in the following is mainly concerned with multi interface hosts and/or cards and a need to eliminate or allow cards to be inserted to hosts depends on the use-case (i.e., legacy card should not be inserted to new host that supports only the newer mode of operation). For example, the techniques presented here could be adopted by standards such as an UFS (Universal Flash Standard) or UHS-II (Ultra-High-Speed $2^{nd}$ generation) standards as defined by the JEDEC standard body or SD Association™, respectively, if and as these are combined with legacy SD™ standard or an SD backward compatible form factor card.

More specifically, the methods provided here can be used separately or in combination to allow a better user experience in case of new memory card specification introduction to a market that widely uses a legacy card. For purposes of discussion, the following will mainly use the example where the legacy card is of the micro-SD (or "µSD" in the Figures and Table 1) type and the new interface card ("NEW") card, such as of the UFS or UHS-II standards mentioned above, with a similar form factor. In order to support both new and old protocols at least for some transition period, the following cards options are possible:
1) Legacy card (micro-SD);
2) Dual interface card (micro-SD-NEW);
3) New interface card (NEW);

and the following host options are possible:
1) Supports only legacy interface (SD)
2) Supports both interfaces (NEW and SD)
3) Supports only new interface (NEW).

Table 1 shows the various card-host matchers for card insertion attempts by users and the functional support:

TABLE 1

| | Possible card - host matches | | |
|---|---|---|---|
| | | Host | |
| Card | Legacy | µSD + NEW | NEW |
| µSD (legacy) | ✓ | ✓ | X1 |
| µSD-NEW | ✓ | ✓ | ✓ |
| NEW card | X2 | ✓ | ✓ |

It should be noted that this discussion also applies to cases where the "NEW" protocol is just an updated or evolved version (e.g., an evolving version of SD, such as UHS-II) of an earlier protocol; for example, additional contacts may be added to an existing standard to increase the data transfer rate and the protocol updated accordingly.

In order to allow the best user experience, the desirable situation would be that all cards will work in all hosts (the situation of micro-SD–NEW card and SD+NEW hosts), but as a practical matter (such as cost of hosts and or cards) that typically would not happen after some, possibly long, transition period. Therefore, the cases of non-functional matches (those marked by "Xn" in the table) need to be taken care and allow optimal user experience for users.

To resolve the above mentioned issue, the embodiments below present a few mechanical design methods that will eliminate from users the ability to get into the above "X" situations of Table 1. In order to prevent users from inserting a legacy card into a new host that does not support legacy cards (case X1 in table 1) a mechanical invention is proposed. The general idea is to use a mechanical structure that allows the new or dual interface card to be differentiated from legacy card, but staying within the legacy (micro-SD in the example) form factor physical margins (allowing it to be inserted to legacy hosts) and, on the host side, to have an automatic mechanism that will distinguish between old card and new or dual interface cards and allowing only the dual interface or new cards to be fully inserted.

In order to provide a portable non-volatile memory that is connectable directly with various types of host devices that include a slot or receptacle having various physical and electronic signal protocol and format characteristics, two or more external sets of electrical contacts are provided on a memory card system that conform to different standards and specifications. The internal memory of the card system, most commonly flash memory, is operable through any of the sets of contacts alone with the appropriate signal protocol. The standards that are implemented are preferably those that will allow the system to be used directly with a wide variety of host devices.

The example memory card systems described herein utilize one set of contacts and a signal protocol from one published memory card standard, such as that for the micro-SD card, and the other set of contacts and a signal protocol according another standard. Although more widely applicable, to provide a concrete example for discussion, in the following one of the standards will taken as a micro-SD ("µSD") card and treated as a legacy product. The other standard will be taken as a card of a similar form factor, but with a different set of contacts, operating protocol, or both. The two set of contacts may be distinct or share some of the contacts. In some cases, one set may be entirely a subset of the other. The types of hosts or "digital appliances" may include examples such cell phones, PDAs, MP-3 players, cameras, personal computers, notebook computers and the like. Additionally, although discussed here for two different protocols, the discussion can be extended to other numbers of multiple protocols.

Figure 1A:
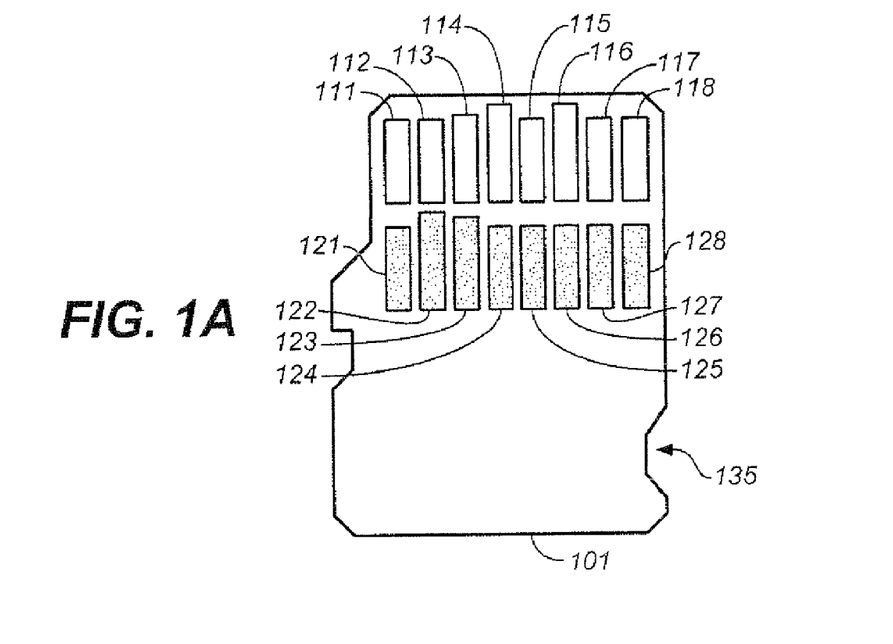
FIGS. 1A and 1B show two examples of an embodiment of a memory card having two sets of electrical contacts that conform with different industry specifications.
Figure 1B:
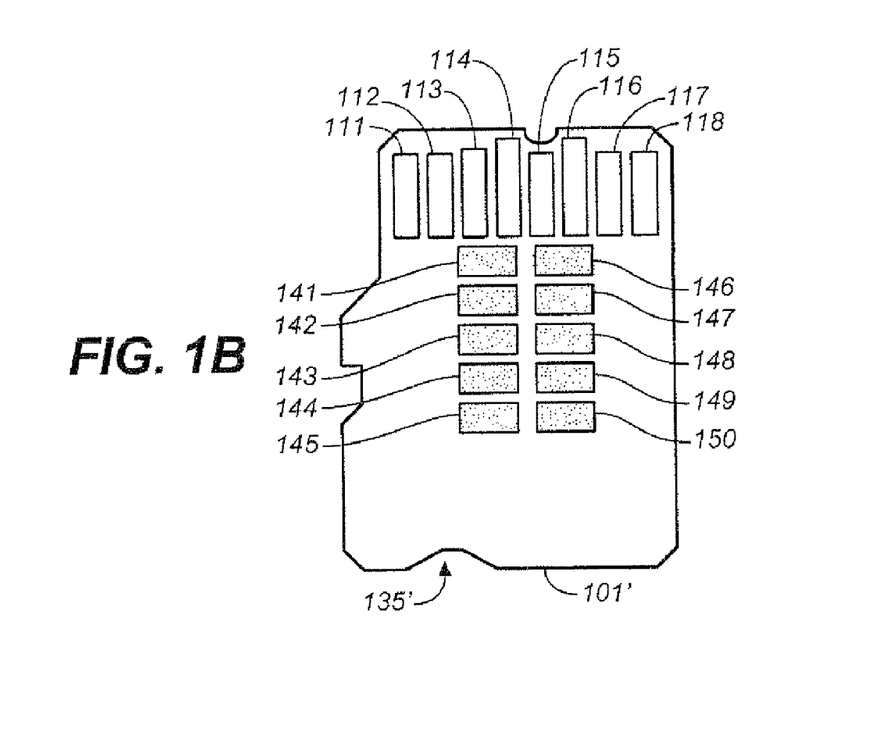

FIGS. 1A and 1B show two examples of a dual interface card. In both cases the form of the memory card system is based on standard unitary memory card with a second set of contacts added. Both the card of the new standard and the legacy standard have similar form factors, in that the form factor physical margins are the same (the micro-SD card in this example), but differ slightly, as described below.

Referring to FIG. 1A, this shows an exemplary embodiment of a memory card 101 having a physical form factor with margins the same as one standard, in this case the micro-SD card, but with an additional indentation 135 formed into its side. According to the micro-SD Memory Card Specifications, eight electrical contacts 111-118 are provided, along with an additional eight contacts 121-128. In the new standard, all of both sets of contacts or some subset could be used for operation in the according to the corresponding protocol. As will be described, the indentation 135 can be used by a host to distinguish a dual interface card, or a card with just the new interface, from a legacy card. In a an arrangement such as card 101, where the card is inserted into the host along the same edge and both interfaces share at least some of the contacts, such a mechanism can be particularly useful for a host to engage the card with the correct protocol.

FIG. 1B shows another exemplary embodiment for a dual interface card. In this embodiment, the card 101' again has a physical form factor with margins the same as that of a micro-SD card and contacts 111-118 of the micro-SD standard. The additional set of contacts 141-150 are for use according to a different protocol. FIG. 1B presents an example where, for engagement according to the additional protocol, the card is inserted in a host by its right side and the corresponding indentation 135' along the bottom edge. In both of FIGS. 1A and 1B, the side with the indentation and the side inserted into the host when the indentation is used are shown as orthogonal, although other angles may be used.

Figure 2:
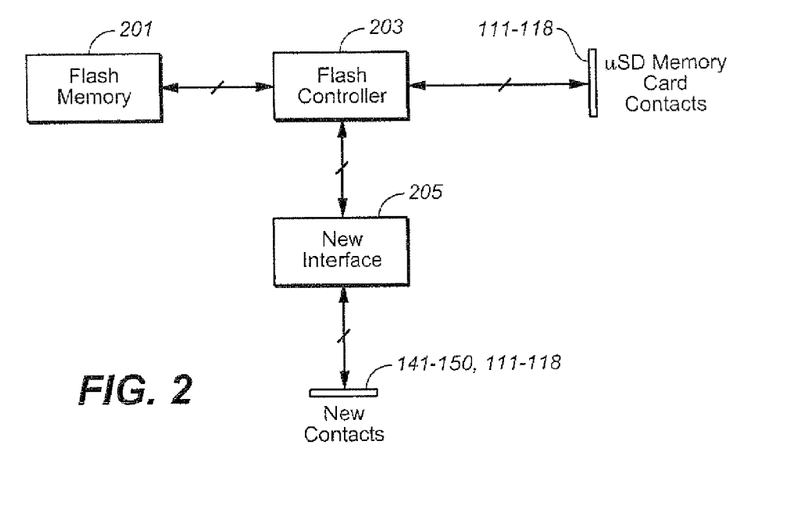
FIG. 2 is an electronic block diagram of the memory system within the card of FIGS. 1A and 1B.

The electronic block diagram of FIG. 2 shows generally one possible example of the electronic system within the structure of card 101 or 101' of FIGS. 1A and 1B. Flash memory 201 can be accessed from the micro-SD card contacts 111-118 through a controller circuit 203. The second set of contacts (111-118 or 141-150) is connected to the controller 203 through an interface circuit 205. Alternatively, a single controller can be used in place of the circuits 203 and 205 to provide both signal protocols, or an additional separate interface could also be included for the contacts 111-118. If one or more additional sets of contacts are provided, provision is made to interface the additional set(s) of contacts with the signal protocols of the additional standard(s).

Figure 3:
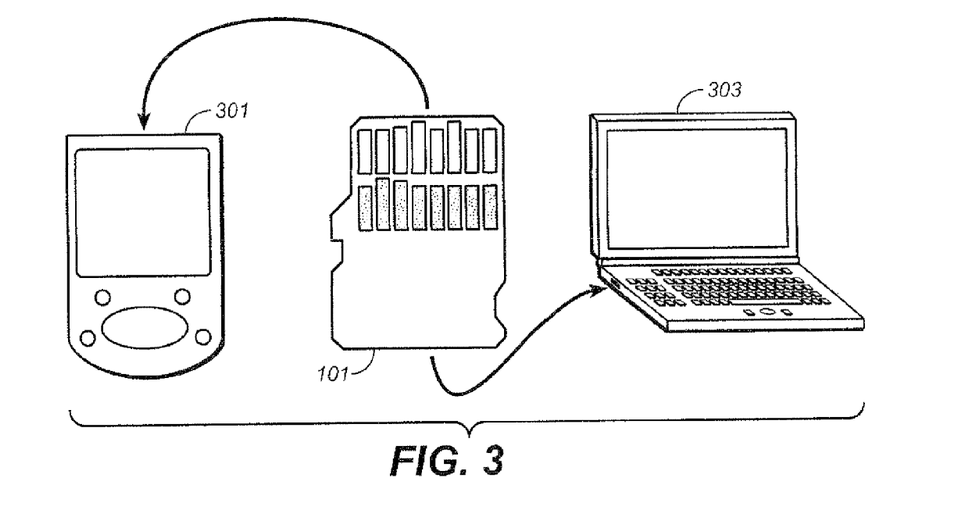
FIG. 3 illustrates use of the card of FIGS. 1A, 1B and 2 with different types of electronic equipment.

Using the two interfaces, the resulting memory system of FIGS. 1A, 1B and 2 is useable with a wide variety of types of host devices. This is illustrated in FIG. 3. The hosts and cards may be of any of the types described above with respect to Table 1. The card, such as the dual interface card of 101 or 101' or a single interface card would inserted into a memory card slot of a hosting digital appliance such as PDA 301 or of a notebook computer 303. By use of the indentation 135, 135' and sort of structure within the host described below with respect to FIG. 4 or 7, the undesired cases of Table 1 can be avoided.

More detail on card structures and hosts, including a number of aspects that can be incorporated here, is presented in the U.S. Pat. Nos. 7,305,535 and 7,364,090, which are hereby incorporated herein by this reference in their entirety. Again, it should be noted that although the present discussion is based on the example of a device with a form factor based on the micro-SD standard, and that this is treated as a legacy device, this in only one example and the techniques presented here are more generally applicable. For example, other embodiments could be based on a (non-micro) SD card as the example of a "legacy" standard and a card of similar form factor, but with, say, extra contacts added as the other standard.

Figure 4A:
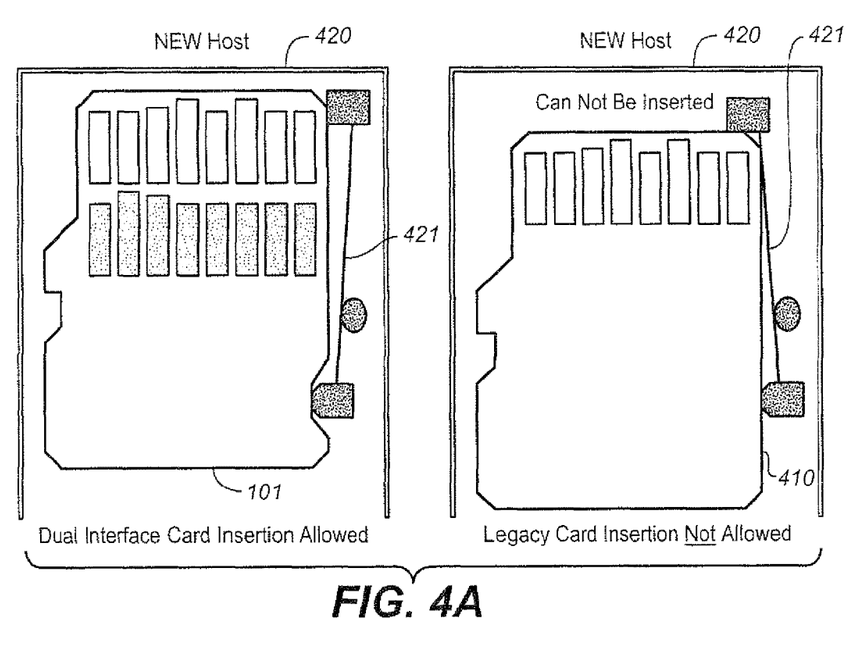
FIGS. 4A and 4B show an exemplary mechanical structure eliminating insertion of a card for one standard to a host of another standard.
Figure 4B:
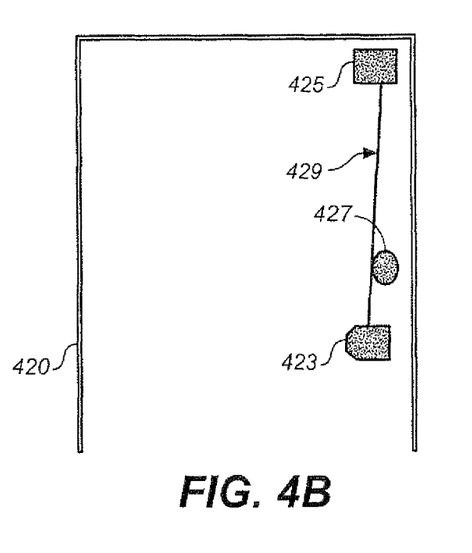

FIG. 4A shows one example of a such a solution on the host side for dealing with the "X1" case of Table 1, by introducing a mechanical structure eliminating the insertion and engagement of (in this example) a legacy micro-SD card into a host which supports the NEW, but not the legacy, standard. FIG. 4A shows the inside of the slot structure 420 of host that only supports the NEW interface/protocol. The mechanical structure 421 within the slot allows a conforming to the NEW standard, whether a dual interface card or just single NEW interface, to engage, while not allowing the legacy card to engage. The opening of the slot itself can have an opening of the typical rectangular, or roughly rectangular, shape common to such slots, although other arrangements may be used. At left, a micro-SD-NEW card 101 with dual interface support (based on a card in which a second row was added for the NEW interface support). The lower end (as oriented in the figure) of mechanic structure 421 moves into the indentation of the card 101. The structure 421 is arranged in the manner of a see-saw, so that as the lower end moves into the indentation on the card 101, the lever arm swings on the medial pivot point so the upper end of the structure 421 moves out of the way, allowing the card to engage to the host. The given small change in the form-factor allows the mechanical mechanism 421 in NEW hosts to recognize the card as supporting the NEW interface/protocol. As shown on the right side of FIG. 4A, for a legacy card 401, as it lacks the indentation, the mechanical structure 421 prevents the card 401 from engaging in the slot 420. FIG. 4B shows the slot structure 420 of the host without the card. In this exemplary embodiment, the mechanical mechanism 421 is shown to be made up of a first element 423 that would fit into the indentation of a card such as 101. The element 425 would then either block the card from engaging, if the indentation is absent, or move out of the way to allow the card to engage as the connecting rod or beam 429 pivots on 427. These various elements of the structure 421 can be formed of plastic, metal, or other materials and, although separately number for explanatory purposes, may be formed as a single piece or multiple pieces that are then joined. For example, all of 423, 525 and 429 could be formed of a single piece of plastic or 425 and 423 may be attached to a 429 of a more rigid metal.

Figure 5:
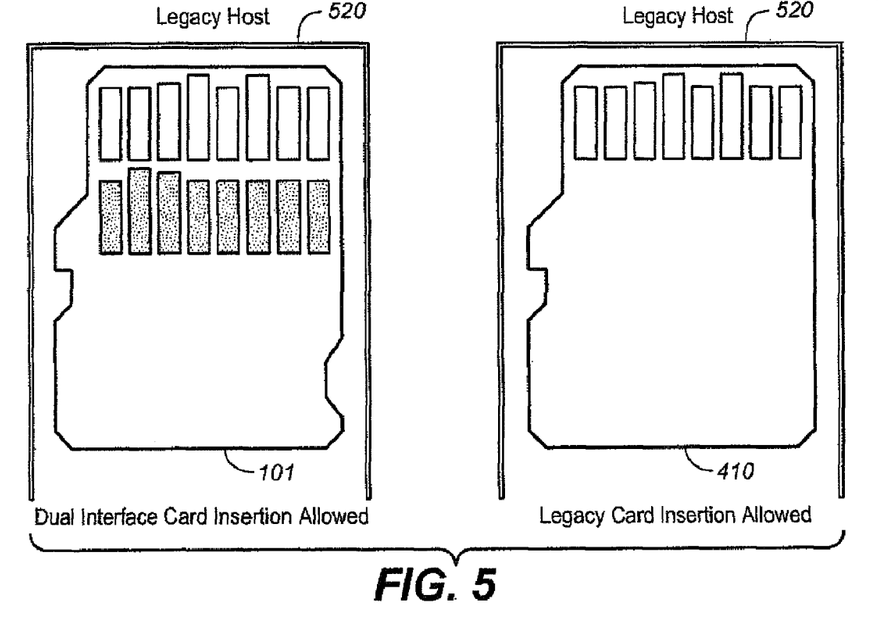
FIG. 5 illustrates a card with for a dual interface and a card with just the legacy interface inserted to a legacy host.

Both the change to the card's form factor and the mechanical structure for the host side are readily implemented and do not affect the insertion of a dual interface card into a legacy (i.e., micro-SD) host. As shown in FIG. 5, the slot 520 of such host will accept a dual interface card 101 (at left) the same as a legacy micro-SD card 410 (at right).

Figure 6:
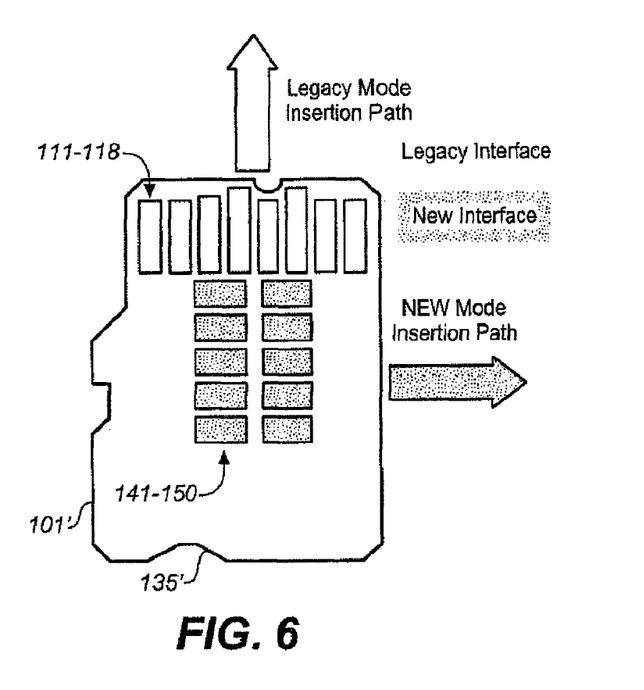
FIG. 6 shows an example of a dual interface with a dual insertion path card.

FIG. 6 shows the embodiment for a dual interface card 101' with dual insertion path of FIG. 1A, but with differing insertion paths indicated. The contacts 111-118 are those of the one interface (here, the "legacy" micro-SD interface) and the contacts 141-150 that of the other. (Note that, as before, the NEW interface pinout and location is just an example.) FIG. 6 illustrates using the same micro-SD physical form factor that includes both legacy and new interfaces, but with two different insertion paths for the two protocols. Using the "narrow" card side for the micro-SD insertion path (as defined for legacy cards) and the 'wide' card side for the new NEW interface usage. The indentation 135' is again along the side perpendicular to the edge inserted into the slot for engagement. Such structure allows usage of the same micro-SD card in all 3 types of hosts of Table 1.

Figure 7:
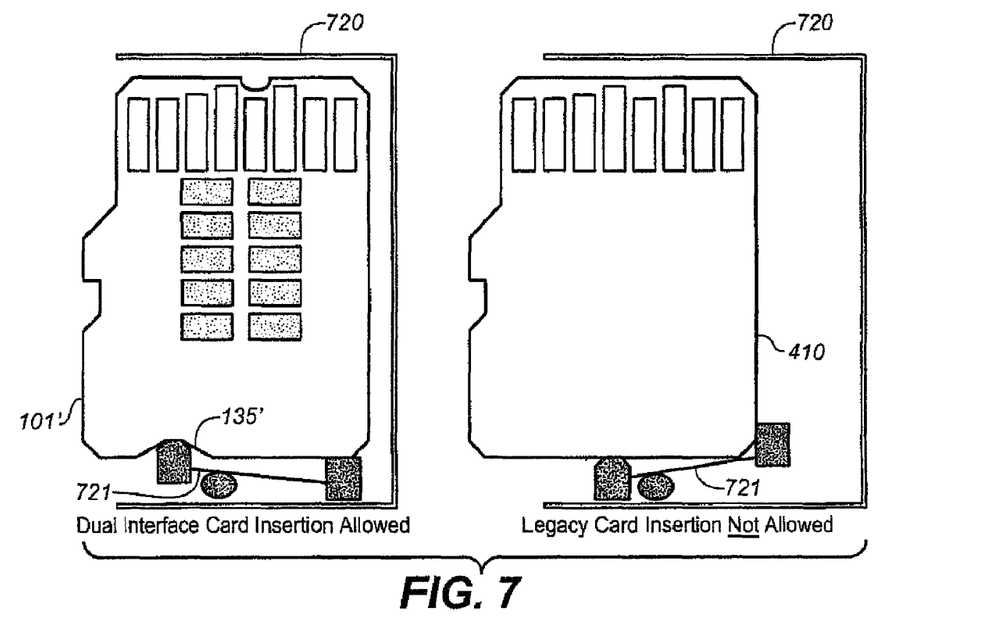
FIG. 7 is another exemplary mechanical structure eliminating the insertion of one card type to second type host.

The NEW hosts can have a wider slot, which would provide an additional, visible, indication for users not to insert old cards to such slots. In addition, in cases that both host and card supports both protocols (new and old), it provides the user the capability to choose the protocol method to be used by the direction the card is inserted. FIG. 7 shows an example of the same, above mentioned, mechanical solution as used for this type of dual-insertion-path cards.

Figure 8:
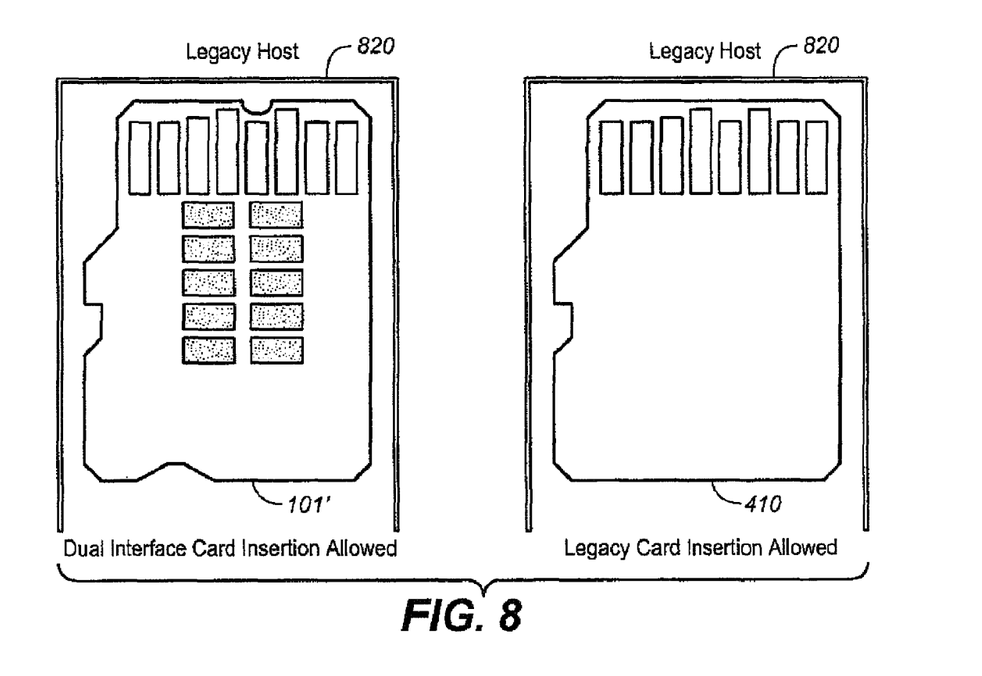
FIG. 8 shows dual interface card (with dual insertion paths) inserted into a legacy host.

Referring to FIG. 7, this illustrates another embodiment for eliminating the insertion and engagement of a micro-SD card 410 into the slot 720 of a NEW host by its "wide" side. As shown at the left, when a dual interface card 101' (or single interface NEW card) is inserted, one end of the mechanical structure 721' moves into the indentation 135, so that the other end moves to the side. The card 110' can then engage to with the host using the contacts 141-150. As shown on the right side, a legacy card 410 lacking the indentation 135 and the mechanical structure 721 will prevent the card's engagement. Under this arrangement, hosts intended to support both protocols (micro-SD and NEW) will need to have the capability to accept card in both insertion paths (a wide for NEW mode and a narrow for SD mode). The given micro-SD-NEW design is still backward compatible to legacy micro-SD hosts and will be inserted and function the same as regular micro-SD card This is shown in FIG. 8, when both a dual interface card 110' (at left) and a legacy card 410 (at right) can be inserted in the slot 720 of a legacy micro-SD host.

The above techniques are based on mechanical and visual preventions/alerts to be used for "illegal" card-host matches. Another, complementary approach to handle such incompatibilities can be by using an electrical detection of card insertions/removal along with attempt to initialize the card using the relevant protocol (either old or new). The idea is as follows: Both type of cards (old and new) may be inserted physically to old/new hosts. Assuming that legacy host is using an electrical method for card detection (either electrical switch or dedicated pad (with pullup/pulldown resistor as suggested in SD card spec), the new hosts (including future hosts that intend to support only the new interface can use the such electrical methods. (Note that such an electrical method can be used in combination with the mechanical techniques for extra assurance.)

After any card-type insertion the host will detect the insertion through the given electrical method. Upon card insertion detection the host will attempt to initialize the card using either one of the protocols—old or new. In ease of non-matched card-host the host will not be able to initialize the card. If such case occurs the host will be able to inform the user (through available GUI) that a Non-Compatible card was inserted to the host. In such a way the user will get feedback from the host that confirms the card insertion and its non-compatibility. Some details relating to an automatic protocol selection mechanism are described in U.S. Pat. No. 7,360,003, which is hereby incorporated herein by this reference in is entirety.

As described above, a number of aspects are presented. According to one of these, a method is presented for providing capability to prevent illegal/unsupported match between new/old card type and new/old host upon the supported functionality. In another aspect, this will also cover the case in which an old card is not supported by a new host that does not support old cards, but will be supported by new host that does support old cards. Other aspects include implementing this using a mechanical, automatic mechanism. In one set of embodiments, a method that is supported by the insertion-path the cards (new/old) are inserted (through wide or narrow edge) each path dedicated for the different type of protocol, a method that also provides for a user to select between new or old protocol by using a different insertion path to the same card.

These techniques allow a good compromise between market needs for low cost memory card transition to new standards and the user's experience of compatibility needs with legacy card standard. The current invention protect from any illegal/unsupported insertion and also provides a method that allows the user to select the active interface by the way he inserts the card.

Although the foregoing aspects have been described in the context of several exemplary embodiments and variations thereof, it will be understood that the appended claims are not limited thereby and the claimed invention is entitled to protection within the full scope of the appended claims.

It is claimed:

1. A digital appliance comprising:
   a slot structure having a slot opening to allow a first type memory card having a first set of contacts to be removably connected by insertion into the slot structure,
   the slot structure having formed therein a mechanical structure including:
      a pivot structure, and
      a lever arm configured to pivot on the pivot structure, wherein a portion of the lever arm is configured to at least partially fit into an indentation of the first type memory card to distinguish the first type memory card from a second type memory card,
   the second type memory card having a second set of contacts, where the first and second sets of contacts differ by at least one of the contacts, and
   the first and second type memory cards having a similar form factor except for the indentation along a first edge of the first type memory card, the first edge being other than a second edge of the first type memory card inserted into the digital appliance when the memory card is inserted into the slot for connection thereto, the first and second edges defining an angle therebetween, whereby the mechanical structure prevents the connection of the second type memory based on the lack of the indentation.

2. The digital appliance of claim 1, wherein the first edge is orthogonal to the second edge.

3. The digital appliance of claim 1, wherein the slot is rectangular or of another form that fits the physical shape of the memory card.

4. The digital appliance of claim 1, wherein the first type memory card also has the second set of contacts.

5. The digital appliance of claim 1, wherein the second type memory card operates according to a micro secure digital (SD) card protocol.

6. The digital appliance of claim 1, where the first and second sets of contacts are distinct.

7. The digital appliance of claim 1, where the first and second sets of contacts share one or more contacts.

8. The digital appliance of claim 1, where one of the first and second sets of contacts is a subset of the other of the first and second sets of contacts.

9. The digital appliance of claim 1, wherein the form factor has the physical margins of a micro SD card.

10. The digital appliance of claim 1, wherein the form factor has the physical margins of an SD card.

* * * * *